May 23, 1944.  R. T. EVANS ET AL  2,349,257
DISK HARROW
Original Filed Feb. 16, 1942   2 Sheets-Sheet 1

INVENTORS
RUSSELL T. EVANS
JOHN H. CLASEN
BY HARRIS, KIECH, FOSTER & HARRIS
FOR THE FIRM
ATTORNEYS

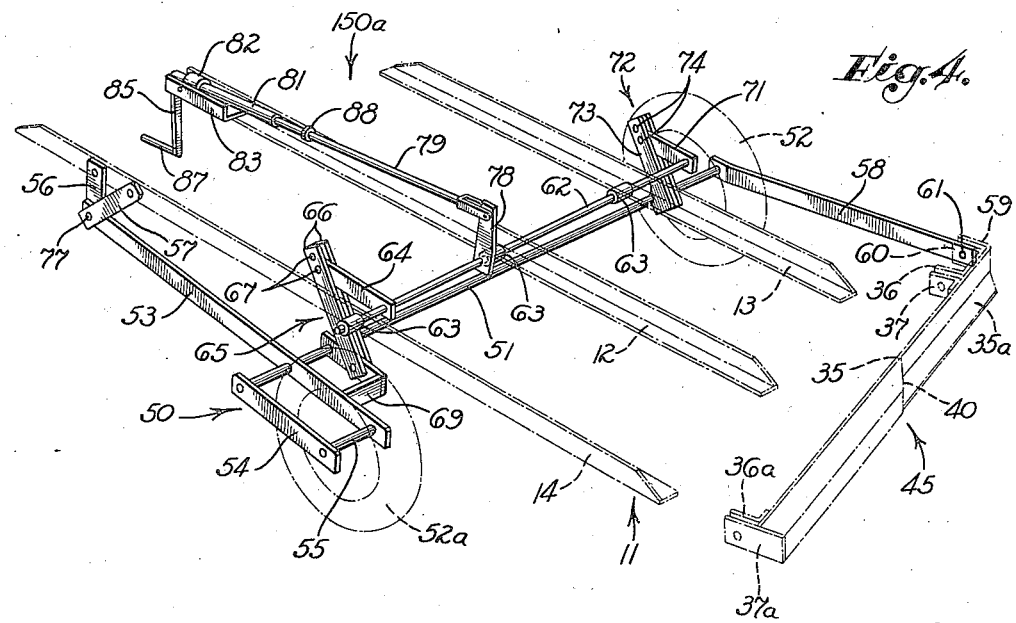
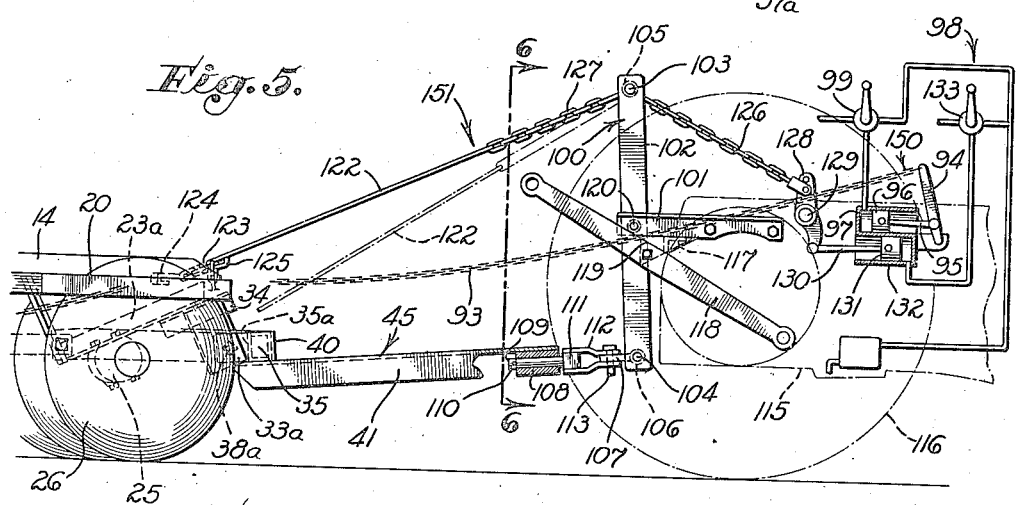
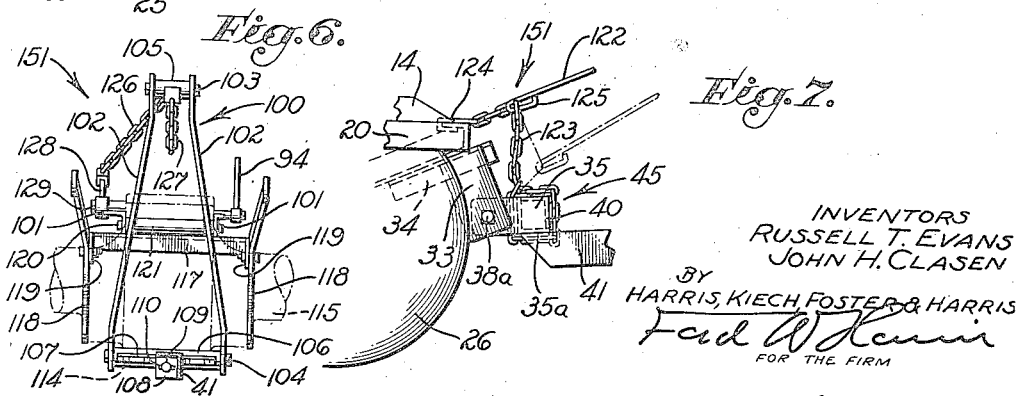

Patented May 23, 1944

2,349,257

UNITED STATES PATENT OFFICE 2,349,257

DISK HARROW

Russell T. Evans and John H. Clasen,
Anaheim, Calif.

Continuation of application Serial No. 431,010, February 16, 1942. This application January 20, 1943, Serial No. 473,030

20 Claims. (Cl. 55—73)

This application is a continuation of our co-pending application, Serial No. 431,010, filed Feb. 16, 1942.

Our invention relates to cultivating tools, with special reference to harrows and is particularly directed to an improved disk harrow of the offset type. In an offset disk harrow a front gang of disks is mounted with the axis of the disks inclined at an angle to the line of travel of the implement and a rear gang of disks is mounted behind the front gang of disks with its axis oppositely inclined to the line of travel. In operation the two gangs create two couples which combine additively to set up a strong tendency for the harrow to swing to one side about a vertical axis located substantially centrally of the harrow. This tendency is resisted by a hitch mechanism connecting the front end of the harrow to a tractor or other pulling agency.

A disk harrow of the particular type to which the present invention is directed is provided with land wheels that are vertically adjustable relative to the disks. During cultivating operation the distribution of the weight of the harrow between the land wheels and the disks depends upon the adjustment of the wheels vertically with respect to the disks, and the consequent depth of soil penetration by the disks likewise depends upon such vertical adjustment. It is one object of the present invention to provide efficient means for vertically adjusting the land wheels with respect to the disks, thereby to control the depth to which the disks cut into the soil.

It is one object of the invention to achieve certain advantages in the operation and control of a disk harrow by arranging for one of the wheels to ride on relatively hard and relatively undisturbed soil and to do so without positioning such wheel laterally away from the harrow path. In this regard a feature of the invention is the concept of causing such a wheel to track in a furrow formed by a forward disk, the bottom of the furrow being relatively compact earth. The other wheel, of course, rides on the loose soil displaced by the front gang of disks and sinks into the soil to a much greater extent than the furrow-tracking wheel, the differential in soil penetration by the two wheels depending both upon the character of the soil and the depth to which the soil is loosened by the disk.

One of the major objects of our invention is to provide for automatic differential positioning of the two wheels vertically in accord with the depth of penetration of the disks, so that when the disks penetrate relatively deeply into the soil, compensation is made for the resultant relatively deep sinking of the wheel that rides on the loosened dirt. Since vertical adjustment of the two wheels is relatively to the harrow frame, the adjustment action may, conversely, be regarded as movement of the frame relative to the two wheels. Thus, when the differential positioning consists of lowering a wheel to compensate for increased penetration of the loosened soil by that wheel, it may be said that the frame is tilted to achieve the compensation, even though the final position of the frame may be substantially horizontal. This object of our invention, then, may be expressed as tilting the frame automatically with reference to the two ground wheels in accord with variations in the depth of penetration.

The depth of penetration by the harrow in a soil of a given character varies with the vertical spacing between the harrow frame and the two wheels. The varying of this vertical spacing may be regarded as accomplished by raising and lowering the wheels relative to the frame, or may be regarded as accomplished by raising and lowering the frame relative to the wheels. Decreasing the vertical spacing results in lowering the disks for deeper penetration into the soil. With reference to the foregoing automatic compensating adjustment, a feature and object of our invention is to provide differential movement of the two wheels relative to the frame whereby in raising and lowering the two wheels relative to the frame one of the wheels is shifted faster than the other to provide the required differential at each stage of vertical change.

In the foregoing we point out two different adjustments that are made dependent on each other, namely, adjustment of the vertical spacing between the frame and the two wheels and differential adjustment between the wheels themselves. A further object of our invention is to provide an independent means of adjustment for varying the wheels vertically relative to each other, or, viewed conversely, for tilting the harrow frame relative to the wheels. A feature of our invention is that the provision of this independent means accomplishes two further objects of the invention. One of these further objects is to provide adjustment means to compensate for variations in character of soil since a wheel with a given load will penetrate much deeper in loosened soil of one character than in loosened soil of another character. The other of these two further objects is to provide adjustment means for tilting the harrow laterally to cause the disks to shift earth to one side or the other, thereby building up the soil level on one side of the path of the tractor and cutting down the soil level on the other side. Thus the present apparatus may be employed to correct undesirable ground contours caused by repeatedly traversing the ground over a period of years with conventional disk harrows.

All such adjustments of the two land wheels relative to each other tending to tilt the harrow frame laterally result in varying the proportions of the frame weight imposed on the two wheels. From one viewpoint it may be said that the adjustments of the two wheels vertically relative to each other are carried out for the purpose of varying the distribution of weight imposed on the wheels and thereby varying the degree to which the wheels penetrate the soil.

A still further object in the preferred practice of our invention is to provide a system for controlling the vertical spacing between the harrow frame and the two wheels whereby a manual means may be employed to determine a normal spacing and independent means, preferably in the form of power-driven means, may be employed to increase the spacing thereby to lift the disks for such purposes as making turns and temporarily reducing resistance to forward travel.

Other objects and advantages of the invention will be apparent from the following description, taken with the accompanying drawings.

In the drawings, which are illustrative only,

Fig. 4 is a perspective view of a modified form of the invention, the view, however, illustrating the depth-regulating frame found in Figs. 1 and 2;

Fig. 5 is a side elevation of a hitch mechanism connecting the forward end of the harrow to the rear end of a tractor;

Fig. 6 is a vertical section taken along the line 6—6 of Fig. 5; and

Fig. 7 is an enlarged detail view, in side elevation, showing the forward end of the harrow and the rear end of the hitch mechanism.

Figure 1:
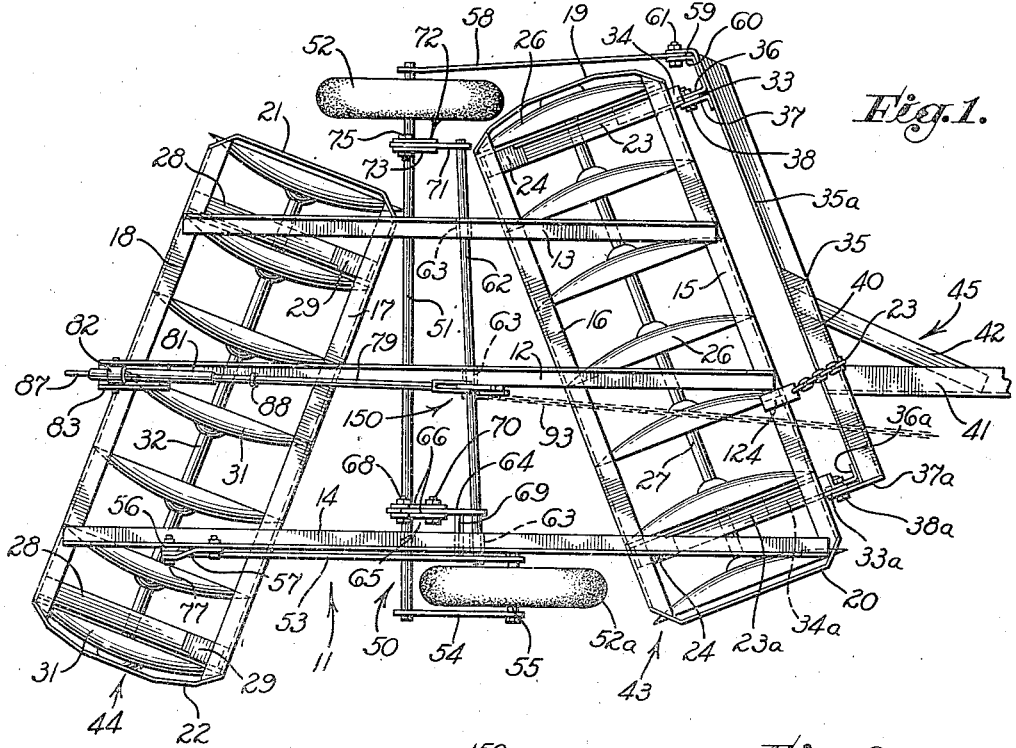
Fig. 1 is a plan view of a disk harrow embodying the invention.

In the following description, the words "land" and "land side" are used to refer to that side of the harrow which is directed toward ground untraveled on previous runs of the harrow in the operation of a single harrowing of the field. The words "furrow" or "furrow side" are used to refer to the side of the harrow opposite the land side.

The harrow includes a main frame 11, a forward gang frame 43 carrying forward disks 26, a rear gang frame 44 carrying rear disks 31, a hitch frame 45, a depth-regulating frame 50, a depth-adjusting mechanism generally designated 150, and a power-actuated mechanism generally designated 151 for elevating the front end of the harrow. The harrow is shown hitched to a tractor, the transmission and axle housing 115 of which and the rear wheels 116 of which are shown in phantom lines in Fig. 5.

The main frame, as best illustrated in Figs. 1 and 4, comprises a central, longitudinally disposed angle-iron bar 12, a somewhat shorter, land side angle-iron bar 13, and a somewhat longer, furrow side angle-iron bar 14, these three angle-iron bars 12, 13, and 14 being rigidly held in parallel spaced relationship by forward and rear angle-iron bars 15 and 16 of the front gang frame 43, and forward and rear angle-iron bars 17 and 18 of the rear gange frame 44. The angle-iron bars 15, 16, 17, and 18 are each welded to all three of the longitudinally positioned bars 12, 13, and 14, the angle-iron bars 15 and 16 being inclined rearwardly toward the land side of the harrow in parallel spaced relationship to form a part of the front gang frame 43, and the rear gang bars 17 and 18 being inclined forwardly toward the land side of the harrow with respect to the longitudinal bars 12, 13, and 14 in parallel spaced relationship to form a part of the rear gang frame 44.

The front gang frame 43 is completed by end members 19 and 20, bearing-supporting bars 23 and 23a, and two bars 24 which connect the lower ends of the bars 23 and 23a respectively to the angle-iron bar 16. These several frame elements are welded together in the relationship shown in the drawings. The end member 19 is preferably formed to present in plan view a bowed contour conforming to the convex side of that one of a gang of disks 26 nearest the land end of the harrow. The furrow end member 20 is formed to conform to the vertical plane of the cutting edge of that one of the gang of disks 26 nearest the furrow end of the harrow.

The cutting disks 26 are mounted on a gang rod assembly 27 rotatably mounted in two bearing boxes 25, the latter being secured to the under side of the bearing-supporting bars 23 and 23a respectively. The front gang frame 43 is so positioned with reference to the main frame bars 12, 13, and 14 that it projects substantially further beyond the main frame bar 13 toward the land side of the harrow than it projects beyond the main frame bar 14 toward the furrow side of the harrow, two of the disk blades 26 being placed outside of the bar 13 and only one disk blade 26 being placed outside of the bar 14.

The rear gang frame 44 is constructed in a fashion similar to the front gang frame 43, comprising a straight, land end member 21, a bowed furrow end member 22, bearing-supporting bars 28, and bars 29 connecting the bars 28 at their lower ends to the rear gang forward bar 17. A gang of disk blades 31 are rigidly mounted on a gang rod assembly 32 which is rotatably mounted in bearing boxes 30 secured to the under sides of the bearing-supporting bars 28 respectively. The rear gang frame 44 is so related to the main frame bars 12, 13, and 14 that two of the rear gang disk blades 31 are positioned outside of the bar 14 projecting toward the furrow side of the harrow, and only one disk blade 31 is outside of the main frame bar 13 projecting toward the land side of the harrow. This relative positioning of the front and rear gangs of disks provides for proper throw of the earth first toward the furrow side of the harrow, and then toward the land side of the harrow, and places the draft line of the harrow as a whole substantially in the vertical plane of the main frame bar 12.

The hitch frame 45 is constructed and related to the rigidly associated main and gang frames to dispose the line of draft of the harrow in the vertical plane of the main frame bar 12 and substantially in the horizontal plane of the axes of both the gangs of disk blades.

The hitch frame 45 comprises a cross-bar 35 disposed at the same angle to the line of draft as the front gang frame 43, and an angle-iron hitch bar 41, the hitch bar extending forward and being welded at its rear end to the cross-bar 35. The cross-bar 35 consists of a length 35a of angle-iron reinforced by an angle-iron 40 disposed to form with the angle-iron 35a a bar of hollow, rectangular cross-section. A brace bar 42, welded to the cross-bar 35 and hitch bar 41, strengthens the hitch frame 45.

For hinged connection to the front gang frame 43, the hitch frame 45 is provided with brackets 36 and 37 at one end and brackets 36a and 37a at the other end. A hinge bolt 38 carried by the brackets 36 and 37 passes through a bracket plate 33 depending from a short angle-iron 34. In like manner a hinge bolt 38a carried by brackets 36a and 37a passes through a bracket plate 33a depending from an angle-iron 34a.

To vary the proportion of the weight of the harrow that is imposed upon the disk blades by the use of land wheels we provide a wheel-supported depth-regulating frame 50. This depth-regulating frame 50 includes a cross-rod or shaft 51 upon the land end of which is rotatably mounted a ground wheel 52. Such a ground wheel may be pneumatic-tired as indicated in the drawings, or may be a conventional iron-rim wheel commonly employed on agricultural implements.

To the furrow end of the cross-rod 51 is rigidly secured a radius bar 53 and a shorter parallel bar 54. The radius bar 53 and the parallel bar 54 straddle a furrow-side ground wheel 52a and are interconnected by a short axle 55 on which the wheel 52a is mounted. The radius bar 53 extends rearwardly to a pivotal connection with the harrow frame, the pivotal connection being provided by a pivot bolt 77 in a pair of converging hanger bars 56 and 57, as best shown in Fig. 4.

The land end of the cross-rod or shaft 51 is connected to the land end of the hitch frame 45 by means of a radius bar 58, the radius bar being pivotally connected at its rear end to the shaft 51 and being pivotally connected at its front end by a hinge pin 61 to a rearward flange 59 of the cross-bar 35 and a bracket 60 welded to the rear face of the cross-bar.

The wheeled depth-regulating frame 50 is likewise linked with the harrow frame at each end by a suitable weight-supporting linkage associated with a cross-shaft 62. As indicated in Fig. 4 the cross-shaft 62 may be journaled in three bearings 63 mounted on the under side of the three main frame angle-bars 12, 13, and 14 respectively. The linkage connection at the land side of the harrow may comprise a pair of link bars 73 pivotally connected to the shaft 51 and an arm 71 pivotally connected to the link bars 73, the arm 71 being rigidly mounted on the cross-shaft 62. In the particular arrangement shown in Figs. 1 and 4, the arm 71 extends between the upper ends of the link bars 73 and is connected to the link bars 73 by a bolt or hinge pin 75. To provide adjustability in the position of the link bars 73 for a given angular position of the arm 71 two or more spaced holes 74 may be provided in each of the link bars 73, in which holes the bolt or hinge pin 75 may be inserted selectively.

For the purpose of providing a link connection at the furrow side of the harrow, the depth-regulating frame 50 may include a bracket member 69 for pivotal connection to the lower end of an upwardly extending pair of link bars 66. As shown in Fig. 4, the two link bars 66 are pivotally connected to an arm 64 that is rigidly mounted on the cross-shaft 62. For adjustment in the positioning of the two link bars 66 for a given angular position of the arm 64 the two link bars may have spaced holes 67 to receive selectively a bolt or hinge pin 68 for pivotal connection to the arm 64.

For most operating conditions, the effective lengths of the link bars 66 as determined by the selected position of the hinge pin 68 will be substantially equal to the lengths of the link bars 73 as determined by the selected position of the hinge pin 75. It is to be noted, however, that the length of the arm 64 on the cross-shaft 62 is substantially greater than the length of the other arm 71 on the cross-shaft. Because of the difference in lengths of the two arms 64 and 71, the link bars 66 on the furrow side move at faster rates than the link bars 73 on the land side when the cross-shaft 62 is rotated. Consequently, the two land wheels 52 and 52a are moved differentially with respect to the harrow frame whenever the cross-shaft 62 is operated.

Figure 2:
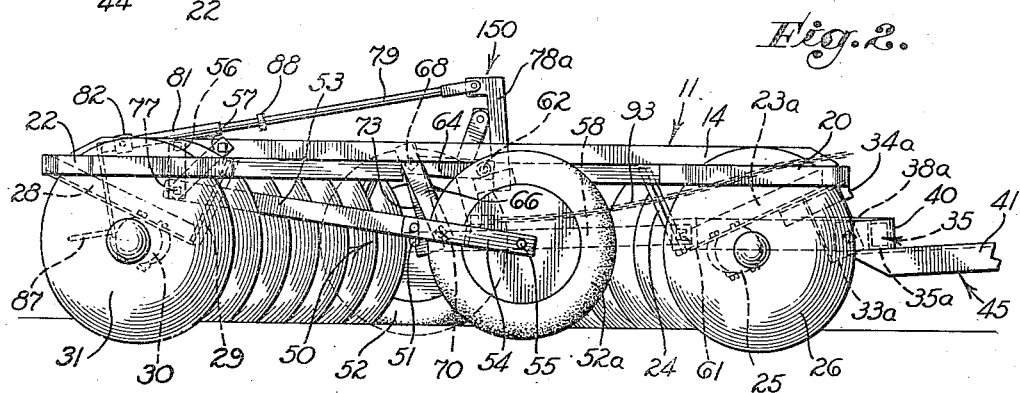
Fig. 2 is a side elevation of the harrow.
Figure 3:
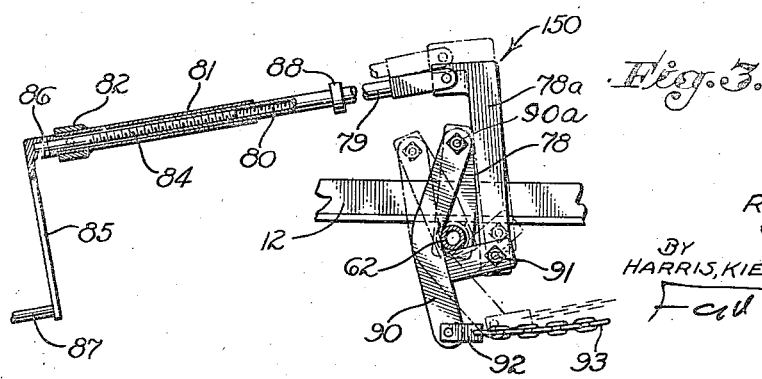
Fig. 3 is a side elevation, partly in section, of the depth-regulating mechanism found in Fig. 2.

Fixedly mounted on the cross-shaft 62 is a control arm 78 which is continuously urged clockwise (as viewed in Figs. 2, 3, and 4) by the weight of the harrow acting through the arms 64 and 71 on the cross-shaft. In the preferred form of our invention illustrated in Figs. 1 to 3, such clockwise rotation of the arm 78 is limited by a stop arm 78a, the stop arm 78a being placed in the clockwise path of the control arm. The stop arm 78a is mounted on one arm of a three-arm actuating lever 90 by means of a pivot bolt 91. The three-arm actuating lever 90 passes around the cross-shaft 62 from below and is pivotally connected to the control arm 78 by a suitable pivot bolt 90a. The normal position of the stop arm 78a and therefore the normal position of the control arm 78 are controlled by what may be termed a reach rod 79.

The reach rod 79 has an internally threaded bore 80 to receive a screw-threaded rod 84. The rear end of the rod 84 is keyed by a pin 86 to a crank 85 having a handle 87. The hub of the crank arm 85 abuts against the rear end of a tubular sheath 81, the reach rod 79 extending rotatably through the sheath. The sheath 81 is welded to an anchoring trunnion 82 that is journaled in the upright flanges of a short channel section 83, the channel section being welded to the rear end of the main frame bar 12. When the arm 85 is turned in a clockwise direction, the rod 79 is pulled rearwardly to rock the control arm 78 and the cross-shaft 62 counter-clockwise. Such counter-clockwise rotation of the shaft 62 acting through the arms 64 and 71 increases the vertical spacing between the level of the harrow frame and the level of the ground wheels 52 and 52a, thereby raising the harrow frame. Reverse movement of the crank arm 85 causes the contrary action to lower the harrow frame together with the harrow disks. A stop collar 88 on the reach rod 79 moves against the forward end of the sheath 81 to fix an upper limit to the elevation of the harrow frame while the cross-shaft 51 moves against the under side of the harrow frame to limit the degree to which the harrow frame may be lowered toward the ground.

The stop arm 78a and the three-arm lever 90 are part of an adjusting mechanism generally designated 150, which adjusting mechanism includes a clevis 92 at the lower end of the three-arm lever and a chain 93 connected to the clevis. The chain 93 extends forward to a lever 94 that is pivotally mounted on the tractor transmission and axle housing 115. The lever 94 is controlled by a connecting rod 95 from a piston 96 within a hydraulic cylinder 97, the hydraulic cylinder being connected in a well known manner to a hydraulic pipe system generally designated 98.

Actuation of the piston 96 in the cylinder 97 is controlled by a suitable manually operable valve 99. Movement of the piston 96 in a forward direction acting through the lever 94 and the chain 93 pulls the lower end of the three-arm lever 90 forward to cause the three-arm lever to fulcrum on the cross-shaft 62. Since the upper end of the three-arm lever 90 is pivotally connected to the end of the control arm 78, the movement of the three-arm lever about the cross-shaft 62 as a fulcrum swings the control arm 78 backward or counter-clockwise to elevate the harrow frame with respect to the ground wheels 52 and 52a. It is apparent that opposite movement of the piston 96, i. e., rearward movement, causes the harrow frame to be lowered by gravity until the control arm 78 swings against the stop arm 78a.

It is apparent that the adjustment of the reach rod 79 by operation of the crank arm 85 determines what may be termed a normal lower limit of the range of adjustment of the harrow frame with respect to the ground wheel. This normal limit may, of course, be changed as desired simply by rotating the crank arm 85. In one practice of the invention the crank arm is rotated to a position normal for the particular soil to be worked and normal for the desired depth to which the soil is to be penetrated. Hydraulic operation of the three-arm lever 90 is thereafter employed temporarily as required, for example, to make a right-hand turn or to pass over an obstacle. If desirable, the crank arm 85 may be rotated to elevate the harrow frame above the particular level represented by the instant position of the piston 96. On the other hand, rotation of the crank 85 in the opposite direction will not result in lowering the harrow frame below the level represented by the instant position of the piston 96. In other words, the harrow frame will seek whichever level is lowest, the level represented by the instant adjustment of the crank 85 or the level represented by the instant position of the piston 96.

Figs. 5, 6, and 7 indicate how a power-lift mechanism generally designated 151 may be employed in conjunction with the hitch frame 45 for the purpose of exerting lifting force on the front end of the harrow. As best shown in Fig. 6, an A frame 100 comprises a pair of upright converging side bars 102, an upper cross-rod 103, and a lower cross-rod 104, the cross-rods being rigidly secured to the side bars 102. The A frame 100 also includes as a rigid portion thereof a transverse tube 121 by means of which the A frame is rotatably mounted on a cross-rod 120, the cross-rod 120 being carried by a pair of spaced angle-irons 101 extending rearwardly from the transmission and axle housing 115 of the tractor. Each of the bars 101 may be reinforced by triangular vertical plates 119 which are interconnected by a transverse angle-iron 117. The particular construction shown in Figs. 5 and 6 is mounted on a tractor having power-actuated lift arms 118, the A frame and the mounting for the A frame lying between the two lift arms.

Rotatably mounted on the lower cross rod 104 of the A frame 100 is a tube 106 integral with a rearwardly extending hitch plate 107, the plate having a plurality of transversely spaced hitch apertures 114. At the forward end of the hitch bar 41 is mounted a swivel block 108 in which is journaled a swivel pin 109. The swivel pin 109 is secured against forward displacement relative to the swivel block by a retaining pin 110 and against rearward displacement by an integrally formed head 111. A pair of clevis bars 112 welded at their rear ends to the head 111 is pivotally connected to the hitch plate 107 by a hitch pin 113 which may be positioned selectively in any of the hitch apertures 114.

A chain 127 is connected to the upper end of the A frame 100 by means of a connecting member 105 that rotatably embraces the upper cross-rod 103 of the A frame. The chain 127 is connected to the upward forward end of a rod 122, which rod is formed to a hook 125 at its rearward lower end for engagement with a chain 123. The hook 125 may be selectively engaged with the various links of the chain 123. The chain 123 is connected at one of its ends to an anchor clip 124 positioned as shown in Fig. 1 on the front bar 15 of the forward gang frame 43 and is connected at its other end to the hitch bar 35 of the hitch frame 45 by means of a wrap about the angle-bars 35a and 40. The upper end of the A frame 100 is likewise connected by a chain 126 to the upper end of an actuating lever 128 on the rear of the tractor, the chain 126 being attached to the previously mentioned connecting member 105 that is journaled on the upper cross-rod 103 of the A frame. The lower arm of the lever 128 is connected by a connecting rod 130 to a piston 131 in a hydraulic cylinder 132. The hydraulic cylinder 132 is in the previously mentioned hydraulic system 98 and the operation of the piston 131 in the hydraulic cylinder is controlled by a manually operable valve 133.

Rearward movement of the piston 131 swings the lever 128 clockwise and by virtue of the chain 126 likewise causes the A frame 100 to swing clockwise on its axis. The thrust thus administered to the bar 41 together with the simultaneous pull given to the rod 122 will lighten the weight of the harrow carried by the forward disks 26. Sufficient rearward movement of the piston 131 may lift the front disks to cause the harrow to tilt rearward on the land wheels 52 and 52a. Excessive rearward movement of the piston may even be employed, if desired, to lift both the front gang of disks and the two wheels 52 and 52a from the soil. It will be readily apparent to those skilled in the art that the hook 125 at the lower rearward end of the rod 122 may be shifted to various links of the chain 123 to vary the harrow-lifting effect for given positions of the piston 131 and the A frame 100.

It is to be noted that the manner in which the harrow works the soil may be varied both by varying the spatial relationship of the two wheels 52 and 52a with respect to the harrow frame and by varying the lift force exerted upon the forward end of the harrow frame through the described hitch arrangement, the preferred form of the hitch arrangement being the power-lift mechanism generally designated 151. The manner in which these two modes of adjustment are employed for various types of soil and various working conditions will lie within the judgment of the operator. While the arrangement is quite flexible in affording a wide choice of adjustments, it is not difficult to master and only the usual skill and knowledge of implements are required on the part of the operator.

Since the harrow is usually given sufficient weight to meet the most severe ground conditions, the two ground wheels 52 and 52a are adjusted to carry a portion of the weight of the harrow whenever maximum application of the weight of the harrow is not required. Thus, for a given penetration of the soil, the vertical spacing between the level of the harrow frame and the level of the ground wheels 52 and 52a will be such that the ground wheels take that share of the weight of the harrow that is not required for the desired depth of penetration. Usually the adjustment of the two land wheels is such that the harrow frame is substantially level and all of the various disk blades penetrate the soil to substantially the same depth. If, however, it is desired that the soil be shifted in one direction or another, the hinge pins 68 and 75 may be shifted as required to cause the harrow frame to tilt laterally toward one side or the other.

The ground wheel 52 travels in the furrow made by the disks 26 directly in front of the ground wheel, the furrow being subsequently covered by dirt displaced by the rear gang behind the land wheel. Preferably, the ground wheel 52 is so positioned and arranged that it rides alongside and crowds somewhat against the land wall of this furrow, thereby steadying the harrow against lateral deviations from its line of travel and giving it a relatively firm foundation level with reference to which the depth of cut of the two gangs of disks is determined. A minor quantity of soil drops into the furrow, especially if the wheel 52 crowds against the land wall of the furrow. Preferably, the width of the tread of the wheel 52 is somewhat greater than the width of the furrow so that the wheel rides somewhat on the sides of the furrow to displace a minor quantity of earth into the bottom of the furrow. Nevertheless the quantity of earth interposed between the wheel and the bottom of the furrow is not large and the interposed earth is compressed by the wheel into compactness comparable with, if not greater than, the compactness of the undisturbed earth forming the natural bottom of the furrow. It is apparent, then, that the land-side wheel 52 rides over compact earth at the bottom of the furrow and does not sink into or penetrate that compact earth to any relatively great extent for a given wheel load.

Since the wheel 52 rides upon relatively compact earth regardless of the depth of penetration of the harrow disks and since the compactness of the earth under the wheel minimizes variations in penetration of the wheel in response to variations of loading placed on the wheel, it will be readily understood that the level of the bottom of the wheel 52 relative to the level of the freshly scooped bottom of the furrow in which it rides will not vary greatly at various adjustments of weight distribution between the two wheels on the one hand, and the gangs of disks on the other hand. In contrast, the wheel 52a on the other side of the harrow rides on soft and loosened soil displaced by the front gang of disks, and it will be found that the wheel 52a will penetrate this loosened soil to various depths under various conditions. The principal factors determining the depth to which the wheel 52a sinks into the loosened soil are the character of the soil, the instant condition of the soil with respect to moisture, the weight imposed on the wheel, and the thickness or depth of the layer of loosened soil.

Under a given loading the wheel 52a may sink one inch into a layer of loosened soil two inches thick and with the same loading may sink two or two and one-half inches into a four-inch layer of loosened soil. In the first instance, the wheel 52a will travel on a level approximately one inch higher than the level of the wheel 52 in the furrow on the land side, while in the second instance the level of the wheel 52a will be approximately one and one-half or two inches above the level of the land-side wheel 52. An important feature of the invention is our concept of providing for the described differential movement of the two wheels 52 and 52a in response to angular movement of the control lever 78, the purpose of providing such differential movement being to compensate for the differences in level of the two wheels 52 and 52a at the different depths of soil penetration as determined by the different elevations of the harrow frame with respect to the two wheels. The required differential movement is achieved by making the arm 64 suitably longer than the arm 71 as heretofore noted. It is contemplated that the compensation will be such that the position of the harrow frame with reference to lateral tilt will be substantially constant at various depths of penetration of a given soil by the harrow disks.

Whether the substantially constant position of the harrow frame will be substantially horizontal or will be tilted to one side or the other for a given soil will depend upon the adjustment of the two arms 64 and 71 with respect to the holes in which the hinge pins 68 and 75 are placed. It is to be noted that the adjustment provided by the series of holes 67 for the hinge pin 68 and the series of holes 74 for the hange pin 75 is independent of and in addition to vertical adjustment of the depth-regulating frame 50, and that this additional adjustment may be employed either to cause the harrow to maintain a laterally tilted position or may be employed to compensate for variations in the character and condition of the soil to the end that the harrow may normally ride in a substantially horizontal position. Thus, if the soil is somewhat lighter than usual so that the wheel 52a tends to drop closer than usual to the level of the wheel 52, the hinge pin 75 may be shifted to an upper hole 74, the hinge pin 68 being in a lower hole 67.

The specific description and illustration herein of a preferred form of our invention will suggest to those skilled in the art various changes and substitutions under our inventive concept, and we reserve the right to all such departures that lie within the scope of our appended claims.

We claim as our invention:

1. A harrow having in combination: a frame; a plurality of soil-working members carried by said frame; a pair of laterally spaced ground wheels to support said frame to various degrees, one of said wheels being positioned to ride upon relatively compact soil and the other of said wheels being positioned to ride upon a layer of relatively loose soil displaced by said soil-working members; means to shift the level relative to the frame of said wheel that rides on compact soil; and means to shift simultaneously in the same direction but at a greater rate the level relative to the frame of said wheel that rides on relatively loose soil, whereby the elevation of the frame relative to the two wheels may be varied to vary the depth of penetration of said members and whereby in varying the relative level of the frame compensation is made for variations in the differences in level of said wheels at different depths of soil penetration by said members.

2. A harrow having in combination: a frame; a plurality of soil-working members carried by said frame; a pair of laterally spaced ground wheels to support said frame to various degrees; means to shift said wheels simultaneously relative to said frame at different rates to vary the level of said frame relative to said two wheels, thereby to vary the proportion of the frame weight carried by the wheels and the extent to which said members penetrate the soil; and means independent of said shifting means to tilt the frame laterally relative to said two wheels, whereby the frame may be positioned relative to the wheels to compensate for relatively deep penetration of the soil by one wheel to cause all of said members to penetrate the soil to substantially the same depth or may be positioned relative to the wheels to cause greater soil penetration by said members on one side of the harrow than on the other side of the harrow.

3. A harrow having in combination: a frame; a front gang of disks carried by the frame, said disks being concave in one lateral direction so that an end disk leaves in its wake an open furrow; a rear gang of disks carried by the frame; a pair of laterally spaced wheels between said gangs of disks to support said frame to various degrees, one of said wheels being positioned to ride on relatively compact earth in said furrow, the other wheel being positioned to ride on the layer of relatively loose earth displaced by said front gang of disks; and means to shift said wheels relative to said frame to vary the level of said frame relative to said two wheels, thereby to vary the proportion of the frame weight carried by the wheels and the extent to which said disks penetrate the soil, said shifting means being adapted to shift the wheel that rides on loosened soil at a faster rate than the wheel that rides in the furrow, thereby to compensate at least in part for changes in the levels of the two wheels relative to each other at different depths of soil penetration by said members.

4. A harrow having in combination: a frame; a front gang of disks carried by the frame, said disks being concave in one lateral direction so that an end disk leaves in its wake an open furrow; a rear gang of disks carried by the frame; a pair of laterally spaced wheels between said gangs of disks to support said frame to various degrees, one of said wheels being positioned to ride on relatively compact earth in said furrow, the other wheel being positioned to ride on the layer of relatively loose earth displaced by said front gang of disks; means to shift said wheels relative to said frame to vary the level of said frame relative to said two wheels, thereby to vary the proportion of the frame weight carried by the wheels and the extent to which said disks penetrate the soil, said shifting means being adapted to shift the wheel that rides on loosened soil at a faster rate than the wheel that rides in the furrow, thereby to compensate at least in part for changes in the levels of the two wheels relative to each other at different depths of soil penetration by said members; and means independent of said shifting means to tilt the frame laterally relative to said two wheels, whereby the frame may be positioned relative to the wheels to compensate for relatively deep penetration of the soil by one wheel to cause all of said members to penetrate the soil to substantially the same depth or may be positioned relative to the wheels to cause greater soil penetration by said members on one side of the harrow than on the other side of the harrow.

5. A harrow having in combination: a frame; a plurality of soil-working members carried by said frame; a pair of laterally spaced ground wheels to support said frame to various degrees, one of said wheels being positioned to ride upon relatively compact soil and the other of said wheels being positioned to ride upon a layer of relatively loose soil displaced by said soil-working members; means to shift the level relative to the frame of said wheel that rides on compact soil; means to shift simultaneously in the same direction but at a greater rate the level relative to the frame of said wheel that rides on relatively loose soil, whereby the elevation of the frame relative to the two wheels may be varied to vary the depth of penetration of said members and whereby in varying the relative level of the frame compensation is made for variations in the differences in level of said wheels at different depths of soil penetration by said members; and means independent of said shifting means to vary the vertical spacing of one of said wheels relative to the frame.

6. A harrow having in combination: a frame; a plurality of soil-working members carried by said frame; a pair of laterally spaced ground wheels to support said frame to various degrees, one of said wheels being positioned to ride upon relatively compact soil and the other of said wheels being positioned to ride upon a layer of relatively loose soil displaced by said soil-working members; means to shift the level relative to the frame of said wheel that rides on compact soil; means to shift simultaneously in the same direction but at a greater rate the level relative to the frame of said wheel that rides on relatively loose soil, whereby the elevation of the frame relative to the two wheels may be varied to vary the depth of penetration of said members and whereby in varying the relative level of the frame compensation is made for variations in the differences in level of said wheels at different depths of soil penetration by said members; and means independent of said shifting means to adjustably tilt said frame laterally relative to said two wheels.

7. A harrow having in combination: a frame; a forward plurality of soil-working members carried by said frame; a rearward plurality of soil-working members carried by said frame; a pair of laterally spaced ground wheels positioned intermediate the two pluralities of soil-working members to support said frame to various degrees, one of said wheels being positioned to ride upon relatively compact soil and the other of said wheels being positioned to ride upon relatively loose soil displaced by said members; means to shift said two wheels relative to the frame, thereby to vary the depth of soil penetration by said members, said shifting means being adapted to shift the wheel that rides on loose soil at a faster rate than the wheel that rides on compact soil, thereby to compensate for variations in the differences in level of said wheels at different depths of soil penetration by said members; and variable means to exert a lifting force on the leading end of said frame.

8. A harrow having in combination: a frame; a plurality of soil-working members carried by said frame; a pair of laterally spaced ground wheels to support said frame to various degrees; means to shift said wheels simultaneously relative to said frame at different rates to vary the level of said frame relative to said two wheels, thereby to vary the proportion of the frame weight carried by the wheels and the extent to which said members penetrate the soil; means independent of said shifting means to tilt the frame laterally relative to said two wheels, whereby the frame may be positioned relative to the wheels to compensate for relatively deep penetration of the soil by one wheel to cause all of said members to penetrate the soil to substantially the same depth or may be positioned relative to the wheels to cause greater soil penetration by said members on one side of the harrow than on the other side of the harrow; and variable means to exert a lifting force on the leading end of said frame.

9. A harrow having in combination: a frame; a front gang of disks carried by the frame, said disks being concave in one lateral direction so that an end disk leaves in its wake an open furrow; a rear gang of disks carried by the frame; a pair of laterally spaced wheels between said gangs of disks to support said frame to various degrees, one of said wheels being positioned to ride on relatively compact earth in said furrow, the other wheel being positioned to ride on the layer of relatively loose earth displaced by said front gang of disks; means to shift said wheels relative to said frame to vary the level of said frame relative to said two wheels, thereby to vary the proportion of the frame weight carried by the wheels and the extent to which said disks penetrate the soil, said shifting means being adapted to shift the wheel that rides on loosened soil at a faster rate than the wheel that rides in the furrow, thereby to compensate at least in part for changes in the levels of the two wheels relative to each other at different depths of soil penetration by said members; and variable means to exert a lifting force on the leading end of said frame.

10. A harrow having in combination: a frame; a plurality of soil-working members carried by said frame; a pair of laterally spaced ground wheels to support said frame, one of said wheels being positioned to ride on relatively compact soil and the other of said wheels being positioned to ride on relatively loose soil displaced by said soil-working members; a first means to shift relative to the frame the wheel that rides on compact soil, said first shifting means including a first rotary means having a given vertical throw controlling the vertical shift of the wheel; and a second means operable simultaneously with said first means to shift relative to the frame the wheel that rides on loose soil, said second shifting means including a rotary member with a vertical throw greater than said given vertical throw, whereby the wheel that rides on soft soil is shifted at a faster rate than the wheel that rides on compact soil, thereby to compensate for variations in the differences in level of said wheels at different depths of soil penetration by said members.

11. A harrow having in combination: a frame; a front gang of disks carried by the frame, said disks being concave in one lateral direction so that an end disk leaves in its wake an open furrow; a rear gang of disks carried by the frame; a pair of laterally spaced wheels between said gangs of disks to support said frame to various degrees, one of said wheels being positioned to ride on relatively compact earth in said furrow, the other wheel being positioned to ride on the layer of relatively loose earth displaced by said front gang of disks; a first means to shift relative to the frame the wheel that rides on compact soil, said first shifting means including a first rotary means having a given vertical throw controlling the vertical shift of the wheel; and a second means operable simultaneously with said first means to shift relative to the frame the wheel that rides on loose soil, said second shifting means including a rotary member with a vertical throw greater than said given vertical throw, whereby the wheel that rides on soft soil is shifted at a faster rate than the wheel that rides on compact soil, thereby to compensate for variations in the differences in level of said wheels at different depths of soil penetration by said members.

12. A harrow having in combination: a frame; a front gang of disks carried by the frame, said disks being concave in one lateral direction so that an end disk leaves in its wake an open furrow; a rear gang of disks carried by the frame; a pair of laterally spaced wheels between said gangs of disks to support said frame to various degrees, one of said wheels being positioned to ride on relatively compact earth in said furrow, the other wheel being positioned to ride on the layer of relatively loose earth displaced by said front gang of disks; a first means to shift relative to the frame the wheel that rides on compact soil, said first shifting means including a first rotary means having a given vertical throw controlling the vertical shift of the wheel; a second means operable simultaneously with said first means to shift relative to the frame the wheel that rides on loose soil, said second shifting means including a rotary member with a vertical throw greater than said given vertical throw, whereby the wheel that rides on soft soil is shifted at a faster rate than the wheel that rides on compact soil, thereby to compensate for variations in the differences in level of said wheels at different depths of soil penetration by said members; and means independent of said shifting means to adjustably tilt said frame laterally relative to said two wheels.

13. A harrow having in combination: a frame; a plurality of soil-working members carried by said frame; a pair of laterally spaced ground wheels to support said frame to various degrees, one of said wheels being positioned to ride on relatively compact soil and the other of said wheels being positioned to ride on relatively loose soil displaced by said soil-working members; means to shift said two wheels relative to the frame to vary the elevation of the frame relative to the wheels, thereby to vary the depth of penetration by said members, said shifting means being adapted to move the wheel that rides on loose soil at a faster rate than the wheel that rides on compact soil to compensate for variations in the difference in level of said wheels at different depths of soil penetration by said members; manually adjustable means to set said shifting means at a minimum elevation of said frame relative to said wheels; and power means to operate said shifting means to raise said frame above said predetermined minimum level.

14. A harrow having in combination: a frame; a plurality of soil-working members carried by said frame; a pair of laterally spaced ground wheels to support said frame to various degrees, one of said wheels being positioned to ride on relatively compact soil and the other of said wheels being positioned to ride on relatively loose soil displaced by said soil-working members; means to shift said two wheels relative to the frame to vary the elevation of the frame relative to the wheels, thereby to vary the depth of penetration by said members, said shifting means being adapted to move the wheel that rides on loose soil at a faster rate than the wheel that rides on compact soil to compensate for variations in the difference in level of said wheels at different depths of soil penetration by said members; a manually adjustable stop means to limit movement of said shifting means in one direction, thereby to determine a minimum level for said frame relative to said wheels; and power means to move said shifting means away from said stop means to elevate said frame above said minimum level.

15. In an offset disk harrow characterized by front and rear oppositely pitched gangs of disks, the combination of: a frame structure upon which said gangs of disks are mounted; a cross-shaft mounted transversely of said frame structure between said front and rear gangs of disks; a ground wheel disposed beneath the land end of said shaft on a bearing having a horizontal transverse axis; a toggle joint linkage between said shaft and said bearing adapted when said shaft is rotated to vary the elevation of said frame structure above said wheel bearing; a ground wheel disposed beneath the furrow end of said frame structure and between said gangs and mounted on a bearing having a horizontal transverse axis; a toggle joint linkage between said shaft and said bearing of said furrow ground wheel adapted to vary the elevation of said frame structure above the bearing of said furrow ground wheel when said shaft is rotated and at a more rapid rate than the variation in elevation effected by said first mentioned toggle joint linkage; and means for rotating said shaft.

16. The combination defined in claim 15 in which said shaft rotating means comprises a manually operated means and in addition to said manually operated means a power means adapted to be operated from a tractor to which the harrow is hitched to rotate said shaft from a position established by said manually controlled means in a direction to elevate said frame structure above said ground wheels.

17. The combination defined in claim 15 in which said shaft rotating means consists of an upwardly extending arm mounted rigidly on said shaft in a position to be urged forwardly by the weight of the harrow; a flexible tension member extending forwardly to the tractor and arranged when under tension to pull backwardly upon said arm; means adapted to be mounted on the tractor for applying tension to said flexible tension member; and a manually movable means adapted to act as an adjustable stop to limit forward movement of said arm.

18. In a disk harrow, the combination of: a harrow frame; gangs of disks carried by said frame; a hitch frame pivotally mounted on said harrow frame on an axis substantially in a horizontal plane of the axes of said disks and said hitch frame extending forwardly from said harrow frame; a frame structure adapted to be mounted on a tractor providing a pivotal mounting on a transverse horizontal axis; an upright member medially pivoted on said mounting, the forward end of said hitch frame being connected to the lower end of said upright member by a universal joint; a flexible tie member connecting the upper end of said upright member with the front portion of said harrow frame, the place of said connection on said front portion being adjustable from a level substantially above the level of said disk axes to a level relatively adjacent thereto; and means under the control of the tractor operator for angling said upright member about its pivotal mounting.

19. In a disk harrow, the combination of: a harrow frame; gangs of disks carried by said frame; a hitch frame pivotally mounted on said harrow frame on an axis substantially in the horizontal plane of the axes of said disks and said hitch frame extending forwardly from said harrow frame; a frame structure adapted to be mounted on a tractor and providing a pivotal mounting on a transverse horizontal axis; an upright member medially pivoted on said mounting, the forward end of said hitch frame being connected to the lower end of said upright member by a universal joint, the upper end of said upright member being substantially above the level of said harrow frame; a flexible tie member connected at its front end to the upper end of said upright member; a chain connected at its upper end to the front portion of said harrow frame at a level substantially above the level of said disk axes and connected at its lower end to the rear end of said hitch frame, the rear end of said flexible tie member being adapted to be connected to said chain at any point between the ends thereof; and means under the control of the tractor operator for angling said upright member about its pivotal mounting.

20. In an agricultural implement, a main frame including longitudinally extending bars, front and rear disk-carrying frames carried by said bars and extending diagonally of the main frame in converging relation to each other toward one side of the implement, an axle extending transversely of the main frame between the front and rear frames, a shaft rockably mounted in front of said axle, a drag link between the front frame and one end of said axle, arms extending rearwardly from said shaft, links connecting said arms with said axle and rotatably supporting the axle, a wheel carried by said axle at the end thereof engaged by the drag link, bars carried by the other end of said axle and extending forwardly therefrom, a wheel rotatably mounted between said bars in front of the axle, one bar extending rearwardly from the axle and pivoted to the rear frame, and means for turning said shaft and swinging its arms to shift the axle vertically and vertically adjust the position of said wheels.

RUSSELL T. EVANS.
JOHN H. CLASEN.